(12) United States Patent
Davis

(10) Patent No.: US 10,442,011 B1
(45) Date of Patent: Oct. 15, 2019

(54) MODULAR FLYWHEEL HOLESAW SYSTEM

(71) Applicant: John D. Davis, Riverton, UT (US)

(72) Inventor: John D. Davis, Riverton, UT (US)

(73) Assignee: ME3, INC, Riverton, UT (US)

( * ) Notice: Subject to any disclaimer, the term of this patent is extended or adjusted under 35 U.S.C. 154(b) by 0 days.

(21) Appl. No.: 15/818,699

(22) Filed: Nov. 20, 2017

(51) Int. Cl.
  *B23B 51/04* (2006.01)
(52) U.S. Cl.
  CPC ...... *B23B 51/0473* (2013.01); *B23B 51/0406* (2013.01); *B23B 51/0466* (2013.01)
(58) Field of Classification Search
  CPC ............ B23B 51/0473; B23B 51/0406; B23B 51/0466
  See application file for complete search history.

(56) References Cited

U.S. PATENT DOCUMENTS

| | | | |
|---|---|---|---|
| 351,059 A | 10/1886 | Maloy | |
| 1,669,273 A | 5/1928 | Wojnowski | |
| 2,803,153 A * | 8/1957 | Golbeck | B23B 51/05 408/174 |
| 3,138,183 A * | 6/1964 | Stewart | B23B 45/003 144/20 |
| 3,837,759 A * | 9/1974 | Bittern | B23B 51/0473 408/204 |
| 4,090,804 A | 5/1978 | Haley | |
| 4,239,427 A | 12/1980 | Walton, II | |
| 4,295,763 A | 10/1981 | Cunniff | |
| 4,669,928 A | 6/1987 | Mediavilla | |
| 5,035,550 A * | 7/1991 | Ajimi | B23B 51/0426 408/204 |
| 5,451,126 A | 9/1995 | Brun | |
| 5,597,274 A | 1/1997 | Behner | |
| 5,651,646 A | 7/1997 | Banke et al. | |
| 5,931,614 A | 8/1999 | Meyen et al. | |
| 6,007,279 A | 12/1999 | Malone, Jr. | |
| 6,015,248 A | 1/2000 | Elliott et al. | |
| 6,099,214 A | 8/2000 | Lee et al. | |
| 6,152,661 A | 11/2000 | Thrasher | |
| 6,249,950 B1 | 6/2001 | Brask et al. | |
| 6,857,831 B2 | 2/2005 | Davis | |
| 8,840,344 B2 * | 9/2014 | Stenman | B23B 51/05 408/186 |

(Continued)

OTHER PUBLICATIONS

Notice of Allowance and Fees Due, Design U.S. Appl. No. 29/672,090, filed Dec. 3, 2018, dated Mar. 4, 2019, 29 Pages.

(Continued)

*Primary Examiner* — Sunil K Singh
*Assistant Examiner* — Paul M Janeski
(74) *Attorney, Agent, or Firm* — Goff IP Law PLLC; Jared Goff

(57) ABSTRACT

A flat flywheel body fabricated by water jet cutting has radial spoke pairs with a display hanger slot in between and flywheel weights circumferentially extending at their peripheral ends. Resilient thin attachment rims for the saw blades are circumferentially connecting the flywheel weights and provide together with them a continuous peripheral sliding surface. A two piece arbor is connected to a central continuous spline of the flywheel body. The peripheral saw blades are bent into concentric curvature by radially clamping them onto the blade attachment rims.

19 Claims, 2 Drawing Sheets

(56) References Cited

U.S. PATENT DOCUMENTS

| | | |
|---|---|---|
| 2004/0161313 A1* | 8/2004 | Nordlin .............. B23B 31/1071 |
| | | 408/204 |
| 2004/0213640 A1 | 10/2004 | Davis |
| 2005/0105980 A1 | 5/2005 | Davis |
| 2013/0039708 A1 | 2/2013 | Stenman |
| 2015/0381012 A1 | 12/2015 | Dugas |
| 2018/0147437 A1 | 5/2018 | Wu |
| 2019/0011010 A1 | 1/2019 | Shaw |
| 2019/0032643 A1 | 1/2019 | Novak |

OTHER PUBLICATIONS

Davis, John D., "Modular Flywheel Holesaw", Design U.S. Appl. No. 29/626,827, filed Nov. 20, 2017, 9 Pages.

\* cited by examiner

MODULAR FLYWHEEL HOLESAW SYSTEM

FIELD OF INVENTION

The present invention relates to holesaws utilizing a flywheel effect. In particular, the present invention relates to modular flywheel holesaw systems with interchangeable saw blades, arbor and flywheel body for cutting holes of various diameters by interchanging the flywheel body.

BACKGROUND OF INVENTION

A prior art hole saw apparatus of the same inventor utilizes a flywheel body to cut holes of up to and above 12" into I-joist webs while being powered by a low torque power tool such as a hand held power drill. A circumferentially evenly distributed flywheel mass balances out for uneven saw tooth engagement and sudden cutting force spikes. During repeated retraction of the saw blades from the circular cutting groove to clear out the saw dust, the power drill induces kinetic energy into the flywheel body that assists in providing sufficient cutting force on the peripheral saw blades during their alternating cutting action.

The saw blades and arbor in this prior art flywheel holesaw are combined with the flywheel body in well known fashion via machined recesses, holes and contours that are offset from one or the other side of the flywheel body. Due to the high centrifugal forces and potentially strong impacts of the fast moving circumference of the flywheel body, it needs to be fabricated from a light yet strong and impact resistant material such as aluminum alloy that may require CNC machining in its prior art configuration. Unfortunately, CNC machining is cost intensive and consequently limiting commercially viable utilization. Therefore, there exists a need for a configuration of the flywheel body that provides on one hand for a utilization of a high grade aluminum alloy while at the same time keeps fabrication costs to a commercially viable minimum. The present invention addresses this need.

There is a need for cutting large size holes in varying diameters and depth. Having to manufacture and/or purchase a complete flywheel holesaw for each commonly needed diameter and depth needed to be cut is again limiting commercial feasibility. Therefore, there exists a need for a modular flywheel holesaw and system that requires only one part to be exchanged to adapt the modular flywheel holesaw to a broad range of hole diameters and hole depths to be cut. At the same time, all components involved need to be manufactured cost effectively. The present invention addresses also this needs.

SUMMARY

A modular flywheel holesaw features a flat flywheel body with its entire contours being substantially height continuous such that it is cost effectively fabricated from aluminum alloy plate by well known water jet cutting. Water jet cutting provides seamless transition from rough to fine and precisely cut contours such that in a single fabrication operation the entire flywheel body is provided in its final shape including a continuous central spline via which the flywheel body is coupled and receiving its rotational torque. Only radial blade attachment holes for the saw blades are drilled into the flywheel body in a separate operation. At the same time, flywheel weights are circumferentially positioned in a stress optimized and balanced fashion with respect to preferably three flywheel spoke pairs. The flywheel spoke pairs preferably feature a display hanger slot between them, via which a number of flywheel bodies may be conveniently hung for storage and/or display.

Blade attachment rims circumferentially connect the flywheel weights and provide resilient support for the saw blades. Together with flywheel weights, the blade attachment rims provide a continuous peripheral sliding surface. As a favorable result, the flywheel body is cost effectively fabricated with high strength, high momentum of inertia, low weight and resilient holding of the saw blades.

A segmented holesaw arbor has an adapter ring that is threaded on a central shaft of it. The adapter ring is attached to the continuous central spline via a number of torque transfer screws that extend through and engage with the continuous central spline in a torque transferring fashion while clamping the flywheel body onto the adapter ring. The central shaft is preferably of a first hardness that is higher than a second hardness of the adapter ring, which in turn is higher than a third hardness of the flywheel body. This dual hardness step down provides for a cost effective selection of materials for the central shaft that is exposed to highest contact forces during attachment to a well known power drill chuck and for holding a well known pilot drill. The adapter ring with its second hardness centrally receives the rotational torque via its thread connection with the central shaft and transfers it in a more distributed fashion onto the flywheel body having the lowest hardness along the torque transmission path from the central power drill onto the peripheral saw blades.

The saw blades may be preferably flat fabricated and bent into corresponding curvature by radially clamping them onto the blade attachment rims. For that purpose, the saw blades may feature central pre bend holes to bend the saw blade evenly into the required curvature depending on the size of the flywheel body. Additional blade positioning holes may be arrayed between a saw teeth edge and a top edge of the saw blade, such that a single set of saw blades may be attached varyingly onto the flywheel body for a broad range of cutting depths.

DETAILED DESCRIPTION

Figure 1:
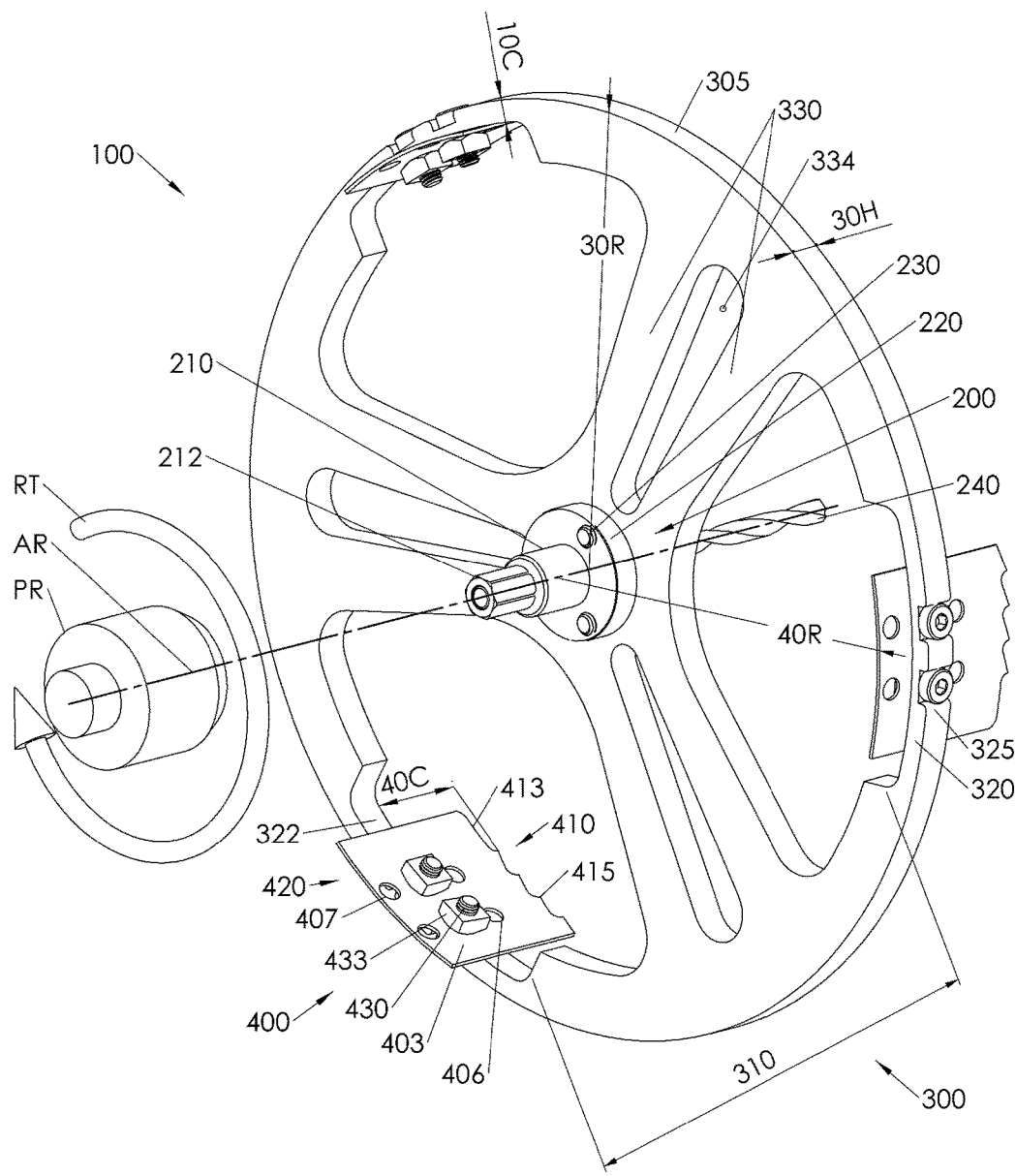
FIG. 1 is a first perspective view onto the top of the modular flywheel holesaw system.
Figure 2:
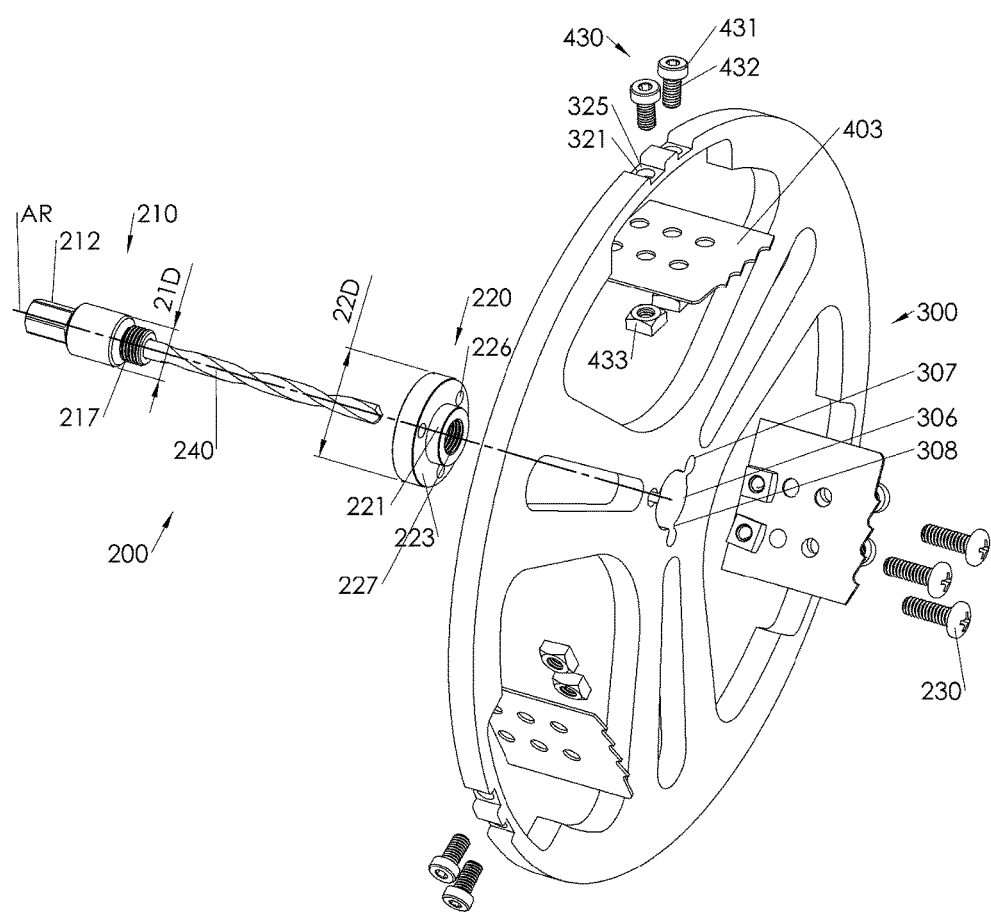
FIG. 2 is a second perspective exploded view onto the bottom of the modular flywheel holesaw system.

A modular flywheel holesaw system 100 includes a segmented holesaw arbor 200, a planar flywheel body 300, preferably three saw blades 400 and a number of torque transfer screws 230. The segmented holesaw arbor 200 is coupling the modular flywheel holesaw 100 to a powered rotation source PR such as a well known power drill chuck. The powered rotation source PR may provide a rotational torque RT around a rotation axis AR in cutting direction. The segmented holesaw arbor 200 has a centering shaft 221 and a number of torque transfer thread holes 226 that are circumferentially arrayed around the centering shaft 221 and that are receiving the torque transfer screws 230.

The planar flywheel body 300 has a central through hole 306 that is corresponding to the centering shaft 221, a number of coupling through holes 307 that are corresponding to the torque transfer thread holes 226, preferably three circumferentially extending and evenly spaced flywheel weights 310 and preferably three circumferential blade attachment rims 320. The flywheel weighs 310 and blade attachment rims 320 together provide a circumferential sliding surface 305 that is circumferentially substantially continuous in a sliding radius 30R around the rotation axis AR. The flywheel body 300 is preferably fabricated from flat plate material with a plate thickness 30H that defines at the same time the width of the sliding surface 305.

Each of the flywheel weights 310 is radially held by at least one but preferably a pair of two flywheel spokes 330 that are spaced apart by a display hanger slot 334. The blade attachment rims 320 are each circumferentially connecting adjacent flywheel weights 310. Each of the blade attachment rims 320 has at least one but preferably two radial blade attachment holes 321 and an inner blade recess 320 that is recessed radially inward from the sliding surface 305.

The saw blades 400 are each curvature fitting tensioned onto an inner blade recess 322 via preferably two blade attachment screws 430 that are extending through the respective saw blade 400 and respective radial blade attachment holes 321. That way, a blade bending curvature 40R of the saw blades 400 is substantially concentric with respect to the sliding surface 305 in a cutting clearance 10C. The cutting clearance 10C is the radial width of the blade attachment rims 320.

The centering shaft 221 and torque transfer thread holes 226 are together with a flange face 223 preferably part of an adapter ring 220 that may be threaded with a central adapter thread 227 of it onto an attachment thread 217 of and thereby fixed to a central shaft 210 of the segmented holesaw arbor 200.

The central shaft 210 has a hex extension 212 on one axial end of the central shaft 210 for coupling the modular holesaw arbor 200 to the powered rotation source PR, whereas the attachment thread 217 is axially extending at one other end of the central shaft 210. A pilot drill 240 is axially extending away from the attachment thread 217 and connected to the central shaft 210.

The flange face 223 is axially positioning the flywheel body 300 with respect to the arbor rotation axis AR and the centering shaft 221 is centering the flywheel body 300 around the arbor rotation axis AR while snug engaging with a central through hole 306 of the flywheel body. This is accomplished by a number of torque transfer screws 230 that are threaded into the torque transfer thread holes 226. The torque transfer thread holes are extending from the flange face 223 in close proximity to a second outer diameter 22D of the adapter ring 220. That way, the flywheel body 300 is axially pressed against the flange face 223 and at the same time is being torque transferring coupled via the torque transfer screws 230 to the segmented holesaw arbor 200. The torque transfer screws 230 transfer the rotational torque RT from the torque transfer thread holes 226 onto the flywheel body 300, while at the same time axially holding the flywheel body onto the holesaw arbor 200.

The second outer diameter 22D is substantially larger than a first outer diameter 21D of the central shaft 210. Correspondingly, the adapter ring 220 may be of a second hardness that is substantially less than a first hardness of a preferably heat treated central shaft 210. The second hardness is substantially higher than a third hardness of the flywheel body 300. That way, peak stresses are material wise accounted for in the first torque transfer interface 217/227 between central shaft 210 and adapter ring 220 and in the second torque transfer interface 226/230/307 between adapter ring 220 and flywheel body 300 as may be clear to everybody skilled in the art. The torque transfer screws 230 may be preferably of a screw hardness that is at least equal to the second hardness. The central through hole 306 and coupling through holes 307 are preferably part of a continuous spline contour 308 that may be conveniently fabricated by a single continuous cutting operation such as water jet cutting.

Each of the flywheel holesaw blades 400 features a blade body 403 that is preferably originally flat prior to its initial attachment to the flywheel body 300, a saw teeth edge 410, a top edge 420 at the opposite end of the saw teeth edge 420, preferably a pair of two pre bend holes 406 and a number of preferably pairs of two blade positioning holes 407. The saw teeth edge 410 has a number of saw teeth 415 and preferably a frontal skidding blade 413 that is in front of the saw teeth 415 with respect to a cutting direction of said rotational torque RT and the saw teeth 415. The preferable pair of two bend holes 406 are centrally in between the saw teeth edge 410 and the top edge 420. The blade positioning holes 407 are aligned with and in offset to the pre bend holes 406 preferably in sets of two and in direction substantially perpendicular with respect to the saw teeth edge 410. Utilizing a pair of two blade positioning holes 407 makes the flywheel holesaw blades 400 rotationally rigidly held via each pair of two onto the flywheel body 300.

Once a hole to be cut is identified in diameter and depth, a correspondingly sized flywheel body 300 may be selected and attached to the segmented holesaw arbor 200 via the torque transfer screws 230. Then saw blades 400 may be initially bent into corresponding blade curvature 40R by tightening the saw blades 400 with blade attachment screws 430 and blade attachment nuts 433 via pre bend holes 406 onto the inner blade recesses 322. The pre bend holes 406 being substantially centrally between the blade top and saw tooth edges 420, 410 provides for an even curvature bending along the saw blade 400 height between the two edges 420, 410. If the thereby defined cutting depth 40C is sufficient for the identified hole to be cut, the saw blades 400 may remain attached at the pre bend holes 406. If more or less cutting depth 40C is desired, the blade attachment screws 406 may be loosened again, reinserted and tightened again in corresponding blade positioning holes 407. The blade screw heads 431 are recessed from the sliding surface 305 within the outer blade screw head recesses 325 such that they do not impede any eventual sliding of the sliding surface 305 during hole cutting operation. The blade screw shafts 432 fit snug through the blade attachment, bend or positioning holes 321, 406/407 and rotationally fix the saw blades 400 on the blade attachment rims 320.

After the modular flywheel holesaw 100 is chucked via the hex extension 212 preferably to a hand held power drill PR, the pilot drill 240 may be positioned at the center of the intended hole to be cut. As the power drill PR is turned on, the modular flywheel holesaw 100 starts to ramp up rotational speed and stores kinetic energy. As the pilot drill 240 drills into the surface, the saw blades 400 may come more or less suddenly into cutting contact. The frontal skidding blades 413 provide a gradual engaging of the saw teeth 415 during the cutting cycle such that the resulting cutting forces only gradually consume the stored kinetic energy and rotational speed. While the saw blades 400 are retracted between cutting cycles, the power drill PR transfers again kinetic energy into the flywheel body 300 and it picks up rotational speed again. At the end of the cutting operation, when the saw blades 400 might suddenly brake through a portion of the cutting groove, the kinetic energy stored in the flywheel body 300 again prevents a sudden jamming of the modular flywheel holesaw 100. Impacts of the saw blades 400 are also elastically absorbed to some degree by the resilient configuration of the thin blade attachment rims 320. This may assist in circumventing sudden break of the thin saw blades 400. In addition and as a particular effect well known for flat flywheels, the flat flywheel body 300 provides also substantial angular stability of the rotation axis AR.

Accordingly, the scope of the present invention described in the Figures and Specification above, is set forth by the following claims and their legal equivalent:

The invention claimed is:

1. A modular flywheel holesaw system comprising:
   a holesaw arbor for coupling the modular flywheel holesaw system to a powered rotation source;
   a flywheel body comprising:
      at least three flywheel spokes;
      a rim attached to the spokes, with the rim comprising at least three blade attachment rim portions that are each circumferentially connecting adjacent ones of the flywheel spokes, each of the blade attachment rim portions defining an inner blade recess that is recessed radially, with each blade recess opening inwardly toward the holesaw arbor; and
   at least three saw blades that are each attached to the rim and positioned at least partially within one of the inner blade recesses in the blade attachment rim portions between adjacent ones of the flywheel spokes.

2. The modular flywheel holesaw of claim 1, wherein the flywheel body defines a central through hole and a number of through holes circumferentially arrayed around central through hole, wherein the central through hole receives a centering shaft, wherein the number of through holes receives corresponding fasteners that participate in securing the centering shaft to the flywheel body, and wherein the central through hole and the number of through holes are part of a single continuous spline contour.

3. The modular flywheel holesaw of claim 1, wherein the flywheel body comprises at least three flywheel weights that are circumferentially extending and evenly spaced from each other, wherein each of the at least three flywheel weights is radially held by a pair of the flywheel spokes.

4. The holesaw system of claim 3, wherein each of the flywheel spoke pairs is spaced apart by a respective radially-extending slot.

5. The holesaw system of claim 1, wherein the holesaw arbor comprises:
   a centering shaft; and
   a number of torque transfer thread holes circumferentially arrayed around the centering shaft.

6. The holesaw system of claim 5, wherein the flywheel body further comprises:
   central through hole that is corresponding to the centering shaft; and
   a number of coupling through holes that are corresponding to the torque transfer thread holes.

7. The holesaw system of claim 6, wherein the flywheel body further comprises at least three flywheel weights that are circumferentially extending and evenly spaced from each other, with each of the flywheel weights being radially aligned with and held by a flywheel spoke.

8. The holesaw system of claim 1, wherein the rim defines an outer circumferential sliding surface that is circumferentially substantially continuous.

9. The holesaw system of claim 1, wherein the at least three saw blades are curvature fitting tensioned onto the inner blade recess via blade attachment fasteners that extend radially through the saw blades such that a blade bending curvature of the saw blades is substantially concentric with respect to an axis of rotation of the holesaw system.

10. The holesaw system of claim 1, further comprising a number of torque transfer screws that transfer rotational torque from the holesaw arbor to the flywheel body.

11. The holesaw system of claim 1, wherein the holesaw arbor comprises an adapter ring and a central shaft, and wherein the adapter ring comprises a second hardness that is substantially less than a first hardness of the central shaft and that is substantially more than a third hardness of the flywheel body.

12. A flywheel holesaw blade comprising:
   a blade body;
   a cutting edge;
   a top edge that is at an opposite end of the blade body from the cutting edge;
   a pre-bend hole that is positioned centrally between the cutting edge and the top edge; and
   one or more blade positioning holes, with the one or more blade positioning holes comprising a plurality of fastener receiving hole areas that are different distances from the cutting edge.

13. The flywheel holesaw blade of claim 12, wherein the cutting edge comprises a frontal skidding blade that is in front of saw teeth on the cutting edge with respect to a cutting direction of the saw teeth.

14. The flywheel holesaw blade of claim 12, wherein the blade positioning holes are positioned on the blade body in pairs of two such that the flywheel holesaw blade is rotationally rigidly held via each of the pairs of two.

15. A method comprising:
   positioning blades of a holesaw that is configured to rotate around an axis so that the blades are circumferentially spaced around a flywheel body of the holesaw, with each of the blades comprising a cutting edge and a top edge that is opposite the cutting edge, and with the positioning of the blades comprising, for each of the blades:
      tightening at least one fastener onto the blade in an area that is centrally located between the top edge and the cutting edge of the blade, with the tightening pressing the blade against a curved surface of the flywheel body and generating a pre-bend curvature of the blade to conform the blade to the curved surface of the flywheel body;
      following the tightening that generates the pre-bend curvature, adjusting a position of the blade to a new position that is different from a position of the blade during the tightening that generates the pre-bend curvature, with the adjusting of the position of the blade changing a distance between the cutting edge and the flywheel body in a direction of the axis; and
      securing the blade to the flywheel body in the new position, with a curvature of the blade in the new position matching the pre-bend curvature.

16. The method of claim 15, wherein the new position comprises the blade being secured against the curved surface of the flywheel body that was used to generate the pre-bend curvature of the blade.

17. The method of claim 15, wherein the new position is axially aligned with a position of the blade during the tightening that generates the pre-bend curvature.

18. The method of claim 15, wherein the at least one fastener used in the tightening that generates the pre-bend curvature is also used in the securing of the blade to the flywheel body in the new position.

19. The method of claim 15, wherein the securing of the blade to the flywheel body in the new position comprises securing the blade with multiple circumferentially-spaced fasteners.

\* \* \* \* \*